United States Patent
Li

(10) Patent No.: US 8,310,584 B2
(45) Date of Patent: Nov. 13, 2012

(54) IMAGE SENSING DEVICE HAVING THIN THICKNESS

(75) Inventor: Taung-Yu Li, Chiayi (TW)

(73) Assignee: Victory Gain Group Corporation, The Valley (AI)

( * ) Notice: Subject to any disclaimer, the term of this patent is extended or adjusted under 35 U.S.C. 154(b) by 259 days.

(21) Appl. No.: 12/769,848

(22) Filed: Apr. 29, 2010

(65) Prior Publication Data

US 2011/0267521 A1    Nov. 3, 2011

(51) Int. Cl.
*H04N 5/225*    (2006.01)

(52) U.S. Cl. ...................................................... 348/340

(58) Field of Classification Search .................. 348/294, 348/302, 308, 374, 272, 314, 65, 340; 250/208.1; 257/225, 231, 290, 291, 292, 432, 447, 460; 438/48, 57, 60
See application file for complete search history.

(56) References Cited

U.S. PATENT DOCUMENTS

| | | | |
|---|---|---|---|
| 5,673,083 A * | 9/1997 | Izumi et al. | 348/340 |
| 7,696,465 B2 * | 4/2010 | Wu et al. | 250/208.1 |
| 7,744,296 B2 * | 6/2010 | Wu et al. | 396/529 |
| 7,969,669 B1 * | 6/2011 | Wu | 359/823 |
| 2005/0184352 A1 * | 8/2005 | Jeong et al. | 257/432 |
| 2005/0224691 A1 * | 10/2005 | Van Arendonk et al. | 250/200 |
| 2009/0243051 A1 * | 10/2009 | Vanam et al. | 257/659 |
| 2009/0273047 A1 * | 11/2009 | Yamamoto | 257/432 |
| 2010/0110270 A1 * | 5/2010 | Sekimoto et al. | 348/340 |
| 2010/0314703 A1 * | 12/2010 | Chen | 257/432 |
| 2011/0141346 A1 * | 6/2011 | Ryu | 348/374 |
| 2011/0157462 A1 * | 6/2011 | Huang | 348/374 |
| 2011/0194022 A1 * | 8/2011 | Yang | 348/374 |

* cited by examiner

*Primary Examiner* — Tuan Ho
(74) *Attorney, Agent, or Firm* — Chun-Ming Shih

(57) ABSTRACT

An image sensing device includes an image sensing chip, an optical module and a protecting element. The image sensing chip has a front surface defining an image sensing region thereon. The optical module includes a barrel and at least one transparent element. The barrel is directly disposed on the front surface and around the image sensing region. The transparent element is disposed in the barrel and faces to the image sensing region. The protecting element covers an area of the front surface outside the optical module and surrounds the barrel. The image sensing device has a thin thickness.

18 Claims, 3 Drawing Sheets

IMAGE SENSING DEVICE HAVING THIN THICKNESS

BACKGROUND

1. Field of the Invention

The present invention relates to a sensing device, and particularly to an image sensing device.

2. Description of the Related Art

FIG. 1 is a schematic, cross-sectional view of a conventional image sensing device. FIG. 2 is a schematic view of a wafer including a number of image sensing devices shown in FIG. 1. Referring to FIG. 1 and FIG. 2, the image sensing device 100 sawed from the wafer 50 includes an image sensing chip 110, a spacer 120, a protecting glass 130 and a lens module 140. An image sensing region 112 is defined on a front surface 111 of the image sensing chip 110. The image sensing region 112 includes a number of light sensitive units 114 arranged in an array. Color filter patterns 116 are respectively disposed on the light sensitive units 114, and micro lenses 118 are respectively disposed on the color filter patterns 116. Additionally, the spacer 120 is disposed on the front surface 111 of the image sensing chip 110 and around the image sensing region 112. The spacer 120 is configured for supporting the protecting glass 130. The lens module 140 is disposed on the protecting glass 130.

In the conventional technique, the protecting glasses 130 over the wafer 50 are a whole and the lens modules 140 over the wafer 50 are also a whole. In other words, the protecting glasses 130 are separated each other by a sawing process of the wafer 50, and the lens modules 140 are separated each other by the sawing process of the wafer 50. Thus, an orthogonal projection area of the lens module 140 on the front surface 111 of the image sensing chip 110 is equal to the area of the front surface 111 of the image sensing chip 110.

The protecting glass 130 in the conventional image sensing device 100 can support the lens module 140 and prevent the image sensing region 112 from particles. However, the spacer 120 is needed to support the protecting glass 130 in the conventional image sensing device 100. The image sensing device 100 will be thickened due to thickness of the spacer 120 and the thickness of the protecting glass 130. Furthermore, a poor flatness of the spacer 120 and a poor flatness of the protecting glass 130 will affect the transmission path of the light, thereby reducing the quality of the image sensing device 100. In addition, it is very difficult for the protecting glass 130 to have a transparence of 100%, thereby reducing a light utility efficiency of the image sensing device 100.

Therefore, what is needed is an image sensing device to overcome the above disadvantages.

BRIEF SUMMARY

The present invention provides an image sensing device having a thin thickness.

To achieve the above-mentioned advantages, the present invention provides an image sensing device includes an image sensing chip, an optical module and a protecting element. The image sensing chip has a front surface defining an image sensing region thereon. The optical module includes a barrel and at least one transparent element. The barrel is directly disposed on the front surface and around the image sensing region. The transparent element is disposed in the barrel and faces to the image sensing region. The protecting element covers an area of the front surface outside the optical module and surrounds the barrel.

In one embodiment provided by the present invention, the protecting element is composed of a molding compound. In detail, the protecting element is composed of, for example, an epoxy molding compound. In addition, the barrel has a top surface, and the protecting element extends, for example, to cover a portion of the top surface of the barrel. Furthermore, the protecting element extends, for example, to cover a number of side walls of the image sensing chip.

In one embodiment provided by the present invention, the protecting element is a guarding ring sleeved on the barrel. Material of the protecting element includes, for example, metal, plastic or ceramic. In addition, the barrel has a top surface, and the protecting element extends, for example, to cover a portion of the top surface of the barrel. Moreover, the protecting element is adhered to the barrel and the image sensing chip through an adhesive.

In one embodiment provided by the present invention, the barrel is adhered to the front surface through an adhesive.

In one embodiment provided by the present invention, an orthogonal projection area of the optical module on the front surface is less than an area of the front surface and is more than an area of the image sensing region.

In one embodiment provided by the present invention, the image sensing region includes a number of light sensitive units arranged in an array and a number of color filter patterns corresponding to the light sensitive units, and the color filter patterns are respectively disposed on the light sensitive units.

In one embodiment provided by the present invention, the image sensing region further includes a number of micro lenses corresponding to the color filter patterns, and the micro lenses are respectively disposed on the color filter patterns.

In one embodiment provided by the present invention, the color filter patterns include a number of red filter patterns, a number of green filter patterns and a number of blue filter patterns.

In one embodiment provided by the present invention, the image sensing chip is a front side illumination (FSI) complementary metal oxide semiconductor (CMOS) image sensing chip.

In one embodiment provided by the present invention, the image sensing chip is a back side illumination (BSI) CMOS image sensing chip.

In one embodiment provided by the present invention, the image sensing device further includes a substrate, and the image sensing chip is disposed on a supporting surface of the substrate and is electrically connected to the substrate.

In one embodiment provided by the present invention, the image sensing chip includes a number of through silicon vias (TSVs), and the image sensing chip is electrically connected to the substrate through the through silicon vias.

In one embodiment provided by the present invention, the substrate includes a number of electrically connecting portions disposed on a rear surface opposite to the supporting surface.

In one embodiment provided by the present invention, the optical module is a lens module, and the transparent element includes at least a lens.

In the image sensing device of the present invention, the optical module is directly disposed on the front surface of the image sensing chip. Thus, the spacer and the protecting glass in the conventional image sensing device can be omitted, thereby reducing the thickness of the image sensing device.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
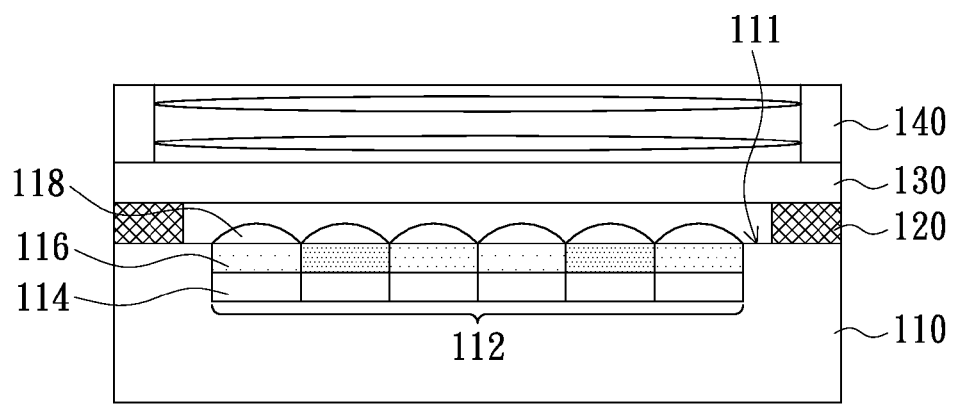
FIG. 1 is a schematic, cross-sectional view of a conventional image sensing device.
Figure 2:
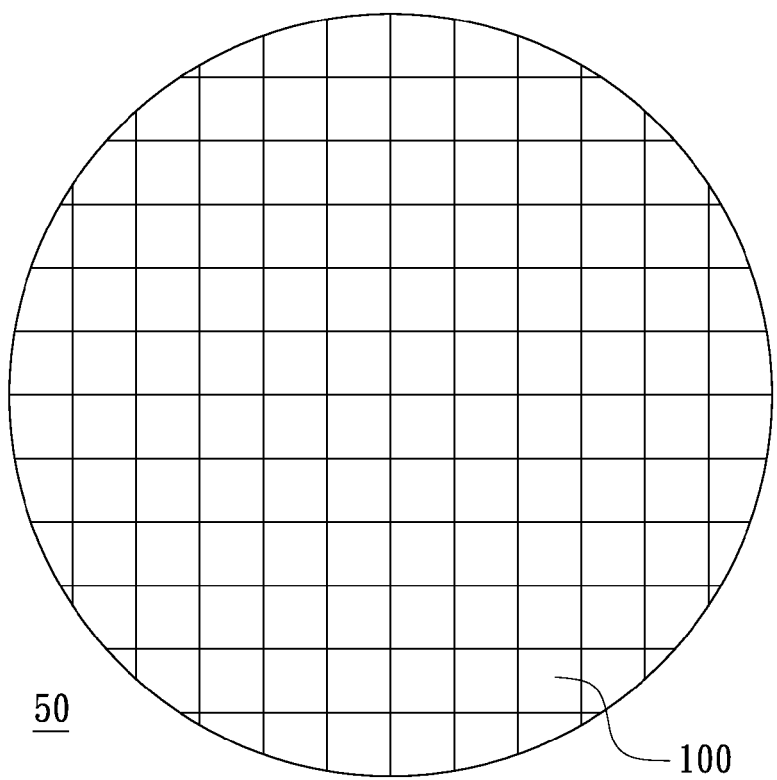
FIG. 2 is a schematic view of a wafer including a number of image sensing devices shown in FIG. 1.
Figure 3:
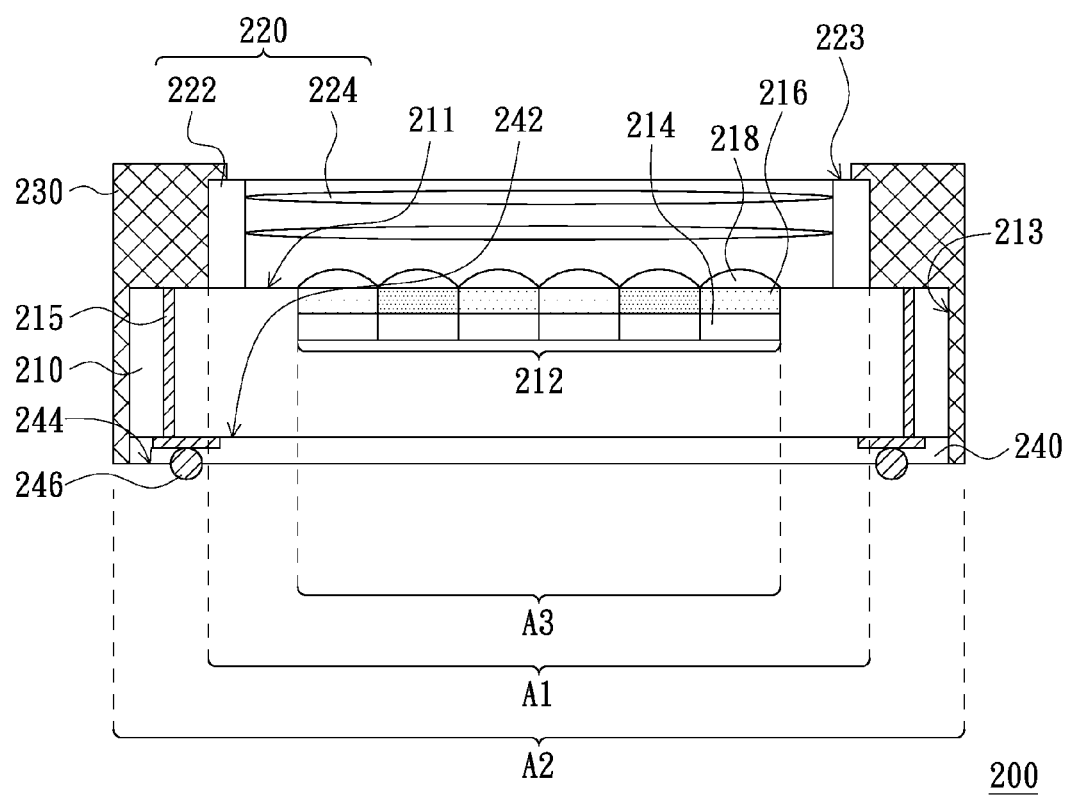
FIG. 3 is a schematic, cross-sectional view of an image sensing device in accordance with an embodiment of the present invention.

FIG. 3 is a schematic, cross-sectional view of an image sensing device in accordance with another embodiment of the present invention. Referring to FIG. 3, in the present embodiment, an image sensing device 200 includes an image sensing chip 210, an optical module 220 and a protecting element 230. The image sensing chip 210 has a front surface 211. The front surface 211 defines an image sensing region 212 thereon. The optical module 220 includes a barrel 222 and at least one transparent element 224. The barrel 222 is directly disposed on the front surface 211 and around the image sensing region 212. The transparent element 224 is disposed in the barrel 222 and faces to the image sensing region 212. The protecting element 230 covers an area of the front surface 211 outside the optical module 220 and surrounds the barrel 222.

The image sensing chip 210 can be, but not limited to, either a front side illumination CMOS image sensing chip or a back side illumination CMOS image sensing chip. In addition, the image sensing region 212 includes a number of light sensitive units 214 arranged in an array and a number of color filter patterns 216 corresponding to the light sensitive units 214. In other words, one of the color patterns 216 corresponds to and is disposed on one of the light sensitive units 214. The color filter patterns 216 are respectively disposed on the light sensitive units 214. The color filter patterns 216 include a number of red filter patterns, a number of green filter patterns and a number of blue filter patterns. Thus, the image sensing chip 210 can sense a color image. It is noted that the color filter patterns 216 are not limited by the above mentioned colors. An arrangement of the color filter patterns 216 is known by one skilled in the art and is not described here. Further, a number of micro lenses 218 corresponding to the color filter patterns 216 can be disposed in the image sensing region 212 so as to improve the light sensing efficiency of the light sensitive units 214. In other words, one of the micro lenses 218 corresponds to one of the color filter patterns 216. The micro lenses 218 are respectively disposed on the color filter patterns 216. Thus, one of the micro lenses 218 can congregate the light to the corresponding light sensitive unit 214, thereby improve the light sensing efficiency of the light sensitive units 214.

For example, the barrel 222 of the optical module 220 is adhered to the front surface 211 of the image sensing chip 210 through an adhesive (not shown). An orthogonal projection area A1 of the optical module 220 on the front surface 211 is less than an area A2 of the front surface 211 and is more than an area A3 of the image sensing region 212. In addition, the transparent element 224 of the optical module 220 can be configured for preventing the image sensing region 212 from particles. The transparent element 224 can be a plane plate or include at least a lens with a certain curvature. In other words, in an embodiment, the optical module 220 can be a lens module. The transparent element 224 (i.e., a lens) of the optical module 220 can be configured for congregating the light so as to improve the light sensing efficiency of the light sensitive units 214.

In the present embodiment, the protecting element 230 is composed of a molding compound. In detail, for example, the protecting element 230 is composed of an epoxy molding compound. That is, the protecting element 230 is formed in a package process. The protecting element 230 can be configured for protecting the image sensing chip 210 and firmly fixing the optical module 220 on the front surface 211 of the image sensing chip 210. In addition, the barrel 222 has a top surface 223, and the protecting element 230 can extend to cover a portion of the top surface 223 of the barrel 222. Thus, an adhesion of the protecting element 230 and the barrel 222 can be increased, thereby avoiding an interspace between the protecting element 230 and the barrel 222. Furthermore, the protecting element 230 can extend to cover a number of side walls 213 of the image sensing chip 210. Thus, the image sensing chip 210 can be protected entirely.

Further, the image sensing device 200 can include a substrate 240. The image sensing chip 210 is disposed on a supporting surface 242 of the substrate 240 and is electrically connected to the substrate 240. Additionally, the image sensing chip 210 can include a number of through silicon vias 215. The image sensing chip 210 is electrically connected to the substrate 240 through the through silicon vias 215. It is noted that the image sensing chip 210 can be electrically connected to the substrate 240 by using other suitable means. In addition, the substrate 240 has a rear surface 244 opposite to the supporting surface 242. A number of electrically connecting portions 246 (e.g., solder balls) are disposed on the rear surface 244. The image sensing device 200 can be electrically connected to a print circuit board of an electronic product (e.g., a mobile telephone, a notebook, or a digital camera, etc.) through the electrically connecting portions 246.

In the present embodiment, the optical module 220 of the image sensing device 200 is directly disposed on the front surface 211 of the image sensing chip 210. Thus, the spacer and the protecting glass used in the conventional image sensing device can be omitted. Comparative to the conventional image sensing device, the image sensing device 200 in the present embodiment has a thinner thickness, thereby reducing the thickness of the electronic product using the image sensing device 200. Additionally, because the spacer and the protecting glass used in the conventional image sensing device are omitted, the problem reducing the quality of the image sensing device and caused by a poor flatness of the spacer and a poor flatness of the protecting glass can be avoided. Furthermore, in the present embodiment, because the protecting glass used in the conventional image sensing device is omitted, the light loss due to the protecting glass can be avoided, thereby increasing the light utility efficiency of the image sensing device 200.

Figure 4:
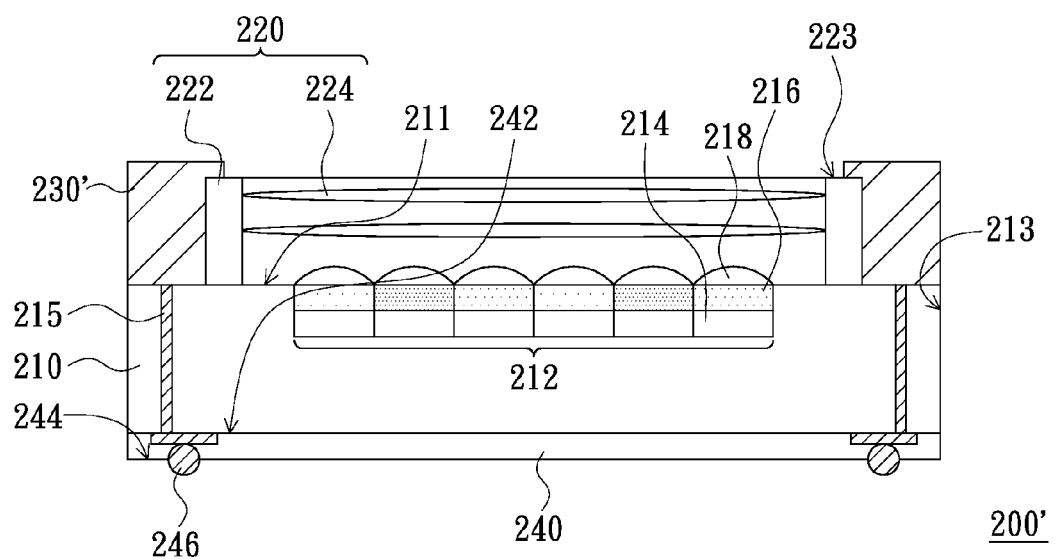
FIG. 4 is a schematic, cross-sectional view of an image sensing device in accordance with another embodiment of the present invention.

FIG. 4 is a schematic, cross-sectional view of an image sensing device in accordance with another embodiment of the present invention. Referring to FIG. 4, the image sensing device 200' in the present embodiment is similar to the image sensing device 200 except the protecting element. In detail, the protecting element 230' of the image sensing device 200' in the present embodiment is, for example, a preformed guarding ring. That is, the protecting element 230' is sleeved on the barrel 222 after the protecting element 230' is formed. The protecting element 230' can be combined with the barrel 222 in a manner of tight fit. In an embodiment, the protecting element 230' can be adhered to the barrel 222 and the image sensing chip 210 through an adhesive (not shown). Thus, the protecting element 230' can be combined together with the barrel 222 firmly and an interspace between the protecting element 230' and the front surface 211 of the image sensing chip 210 will be avoided.

Material of the protecting element 230' includes, for example, metal, plastic, ceramic or other suitable material. The protecting element 230' can cover an area of the front surface 211 outside the optical module 220 and surround the barrel 222. Also, the protecting element 230' can be designed to extend to cover a portion of the top surface 223 of the barrel 222. In another embodiment, the protecting element 230 can be designed to extend to cover the side walls 213 of the image sensing chip 210.

Advantages of the image sensing device 200' in the present embodiment is similar to the advantages of the image sensing device 200 and are not described here.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An image sensing device, comprising:
   an image sensing chip having a front surface, and the front surface defining an image sensing region thereon;
   an optical module, comprising:
     a barrel directly disposed on the front surface and around the image sensing region; and
     at least a transparent element disposed in the barrel and facing to the image sensing region; and
   a protecting element covering an area of the front surface outside the optical module and surrounding the barrel;
   wherein the barrel has a top surface, and the protecting element extends to cover a portion of the top surface of the barrel.

2. The image sensing device as claimed in claim 1, wherein the protecting element is composed of a molding compound.

3. The image sensing device as claimed in claim 2, wherein the protecting element is composed of an epoxy molding compound.

4. The image sensing device as claimed in claim 2, wherein the protecting element extends to cover a plurality of side walls of the image sensing chip.

5. The image sensing device as claimed in claim 1, wherein the protecting element is a guarding ring sleeved on the barrel.

6. The image sensing device as claimed in claim 5, wherein material of the protecting element is selected from a group consisting of metal, plastic and ceramic.

7. The image sensing device as claimed in claim 5, wherein the protecting element is adhered to the barrel and the image sensing chip through an adhesive.

8. The image sensing device as claimed in claim 1, wherein the barrel is adhered to the front surface through an adhesive.

9. The image sensing device as claimed in claim 1, wherein an orthogonal projection area of the optical module on the front surface is less than an area of the front surface and is more than an area of the image sensing region.

10. The image sensing device as claimed in claim 1, wherein the image sensing region comprises a plurality of light sensitive units arranged in an array and a plurality of color filter patterns corresponding to the light sensitive units, and the color filter patterns are respectively disposed on the light sensitive units.

11. The image sensing device as claimed in claim 10, wherein the image sensing region further comprises a plurality of micro lenses corresponding to the color filter patterns, and the micro lenses are respectively disposed on the color filter patterns.

12. The image sensing device as claimed in claim 10, wherein the color filter patterns comprises a plurality of red filter patterns, a plurality of green filter patterns and a plurality of blue filter patterns.

13. The image sensing device as claimed in claim 1, wherein the image sensing chip is a front side illumination CMOS image sensing chip.

14. The image sensing device as claimed in claim 1, wherein the image sensing chip is a back side illumination CMOS image sensing chip.

15. The image sensing device as claimed in claim 1, further comprising a substrate, wherein the image sensing chip is disposed on a supporting surface of the substrate and is electrically connected to the substrate.

16. The image sensing device as claimed in claim 15, wherein the image sensing chip comprises a plurality of through silicon vias, and the image sensing chip is electrically connected to the substrate through the through silicon vias.

17. The image sensing device as claimed in claim 15, wherein the substrate comprises a plurality of electrically connecting portions disposed on a rear surface opposite to the supporting surface.

18. The image sensing device as claimed in claim 1, wherein the optical module is a lens module, and the transparent element includes at least a lens.

* * * * *